United States Patent [19]

Bara

[11] 3,869,724

[45] Mar. 4, 1975

[54] MAGNETIC TAPE HEAD INDEXING ASSEMBLY FOR A CARTRIDGE TAPE PLAYER

[75] Inventor: Edwin S. Bara, Chicago, Ill.

[73] Assignee: Motorola, Inc., Chicago, Ill.

[22] Filed: Jan. 23, 1974

[21] Appl. No.: 436,001

[52] U.S. Cl. ............ 360/106, 242/55.19 A, 360/75, 360/96

[51] Int. Cl. ........................ G11b 21/08, G11b 5/56

[58] Field of Search ....... 360/106, 77, 78, 105, 109, 360/104, 75, 93; 74/84, 112; 179/100.1 PS, 100.1 R; 242/199, 200, 194, 55.19 A

[56] References Cited

UNITED STATES PATENTS

| | | | |
|---|---|---|---|
| 3,575,422 | 4/1971 | Peltz et al. | 360/106 |
| 3,628,796 | 12/1971 | Ban | 360/106 |
| 3,656,761 | 4/1972 | Laschenski | 360/106 |
| 3,703,295 | 11/1972 | Yamamoto et al. | 360/106 |
| 3,740,493 | 6/1973 | Huber | 242/55.19 A |
| 3,809,827 | 5/1974 | Oyaba | 360/106 |

*Primary Examiner*—Alfred H. Eddleman
*Attorney, Agent, or Firm*—Vincent J. Rauner; Donald J. Lisa

[57] ABSTRACT

A tape head indexing assembly for a cartridge tape player having a magnetic tape head mounted for movement with respect to the tape tracks on a magnetic recording tape in a cartridge received in the player, a rotatable capstan for driving the tape through the cartridge and a flywheel mounted on the capstan to impart rotation thereto, includes a rotatable cam having a plurality of cam surfaces, each of which corresponds to one of the recording tracks on the tape and a lever arm mounted adjacent the tape head for pivotal and longitudinal movement. One end of the lever arm is positioned for engaging the cam to drive the latter rotatably to index the tape head. The opposite end is positioned for engagement with the rotating flywheel. An actuator, taking the form of an electromagnet or a mechanical arm, causes the lever arm to be pivoted so that the opposite end of the lever arm is engaged by the flywheel and driven longitudinally. Movement of the lever arm as described drives a pawl at the one end thereof into engagement with a ratchet wheel formed integrally with the cam to rotate the latter. A cam follower coupled to the tape head and riding on the cam surfaces of the cam imparts movement to the tape head for the repositioning thereof with respect to the tape tracks.

11 Claims, 7 Drawing Figures

MAGNETIC TAPE HEAD INDEXING ASSEMBLY FOR A CARTRIDGE TAPE PLAYER

BACKGROUND

This invention relates generally to multi-track cartridge tape players and more particularly to magnetic tape head indexing mechanisms for use therein.

Conventionally, the shifting of a magnetic tape head with respect to the various tracks on a multi-track magnetic tape provided in a cartridge received in a tape player, is accomplished through the use of a relatively large solenoid which is positioned to operate a ratchet wheel which rotates an indexing cam. The cam includes a plurality of surfaces which when engaged by a cam follower also in contacting relation with a movably mounted tape head, positions the latter to different vertical levels in alignment with the various tape tracks.

An electrical signal developed in the tape player energizes the solenoid to move a pawl engageable with the ratchet wheel to index the tape head. As mentioned heretofore, a large solenoid is required to operate the pawl and ratchet mechanism. The solenoid is expensive and requires a large power consumption. The latter are disadvantages, especially in the case of a tape player mounted in an automobile for operation by the vehicle battery. Furthermore, a large solenoid requires additional space within the tape player housing.

To overcome the above drawbacks, tape head indexing assemblies have been provided which operate in accordance with force generated by the flywheel in the tape player used to drive the capstan. Such an indexing assembly is shown in U.S. Pat. No. 3,740,493, assigned to the same assignee as the instant application.

While these indexing assemblies operate satisfactorily and overcome the need for a large solenoid, they often require many additional components not otherwise required. The cost of fabricating and assembling these many components becomes great and as such increases the overall price of the tape player.

SUMMARY

Accordingly, it is a primary object of the present invention to provide a new and improved tape head indexing assembly which makes use of the force provided by the flywheel of the tape player to index the tape head and which has fewer parts and is easy to assemble.

It is another object of the present invention to provide a tape head indexing assembly of the above described type which is simple in construction and has a relatively low fabrication cost.

Briefly, a preferred embodiment of the tape head indexing assembly according to the invention includes a lever arm having a pawl formed thereon. The lever arm is positioned so that the pawl is located adjacent a conventional ratchet-cam wheel which is employed to move a magnetic tape head vertically in the player with respect to the tape tracks on the magnetic tape in a cartridge inserted into the player.

SUMMARY

Near one end of the lever arm, there is provided a small electromagnet which when energized attracts the lever arm to pivot it. At the opposite end of the lever arm there is provided a projection which is employed for engaging specially formed recesses in one face of the rotating flywheel of the tape player.

Energization of the electromagnet pivots the lever arm to move the projection therein into position for engagement with the flywheel. Engagement therewith causes the lever arm to be moved longitudinally to drive the pawl into engagement with the ratchet portion of the ratchet-cam wheel. The latter in turn is rotated to index the tape head. Once the flywheel recess passes the projection, a spring returns the lever arm to its original position.

In another embodiment of the invention, the electromagnet is replaced by a mechanical, manually operated arm member which is accessible from the front of the tape player. The mechanical arm pivots th lever arm for operation of the indexing assembly.

DETAILED DESCRIPTION

Figure 1:
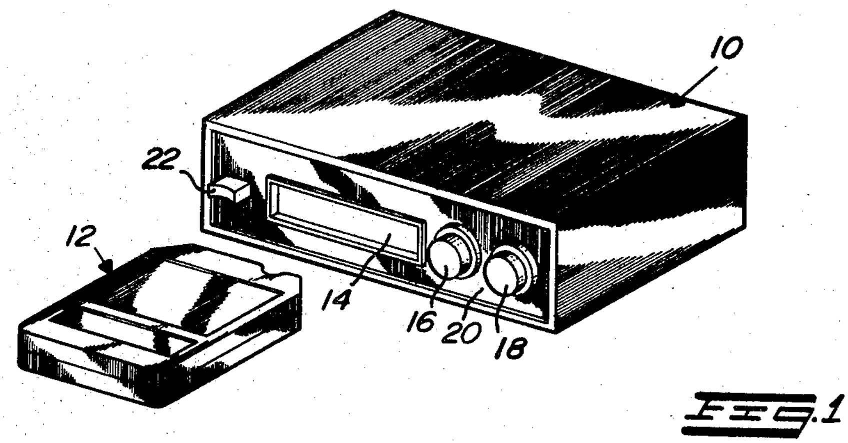
FIG. 1 is a perspective view of a cartridge tape player and tape cartridge including a tape head indexing assembly according to the invention.

Referring now to the drawings in greater detail wherein like numerals have been employed throughout the various views to designate similar components, there is illustrated in FIG. 1 a cartridge tape player 10 designed to play back information recorded on a multi-track magnetic tape provided in a tape cartridge 12 received in the tape player. The cartridge is received in a cavity 14 accessible through the front wall 20 of the player. The usual control knobs such as 16, 18, for on/off and volume, are provided on the front wall 20 of the player. A tape head indexing actuator switch button 22 is also provided thereon. In addition to the above, the tape player 10 includes the usual tape playing and driving instrumentalities as well as a tape head indexing assembly 23 (see FIGS. 2–4 and 7) according to the invention.

Referring to FIGS. 2–4 and 7, there is shown therein the tape deck portion 29 of the tape player 10. Mounted on the lower or base wall 27 of the tape deck portion is a magnetic tape head 24 of the usual type. The tape head is mounted for vertical movement with respect to the various recording tracks of a multi-track tape (not shown) provided in tape cartridge 12 received in cavity 14 of the player. The tape head is held in a fixture 26 which is mounted on the base wall 27 of the tape deck portion. The fixture provides movement of the tape head in a vertical plane to position the magnetic pickups 28 of the tape head with respect to the tape tracks on a recording tape. The tape head mounting fixture 28 is of a conventional type having a fixed support block 30 and two pairs of parallel arms 32, 34 extending therefrom. The fixed support block 30 is attached to stationary support member 31 fastened to the base wall 27 of the tape deck portion. At the opposite end of the arms extending from block 30, there is provided a movable block 36 in which the the tape head 24 is mounted. The latter block is movable in accordance with the pivoting of the arms 32, 34 in their respective locations in the fixed and movable blocks 30, 36. A coil spring 38 mounted at the rear of the fixture biases the block 36 downwardly so that a cam follower 42 at the end of an arm 40 attached to the top of block 36 is maintained in contacting relation with a rotatable cam 44 employed to index the tape head. While a preferred embodiment of the tape head mounting fixture has been shown and described, the fixture can take any suitable form if desired.

The cam 44 is mounted for rotation on a shaft 46 positioned in a support 48 which is mounted on the base wall 27 of the tape deck portion. The cam includes a plurality of cam surfaces 50 which serve to position the tape head to various corresponding positions in accordance with the movement of the surfaces into contacting engagement with cam follower 42.

Also mounted on base wall 27 of the tape deck portion is a capstan housing and bearing structure 52 into which a capstan shaft 54 is inserted for rotation. A flywheel 56 is coupled to the free end of the capstan 54 for rotation therewith in the direction of arrow 57 (see FIG. 7). A tape drive motor 58 of the usual type is also mounted on the base wall 27. The motor supplies the driving force for rotating the flywheel and capstan. The force is transferred from the motor to the flywheel through a belt 60 looped about the periphery of the flywheel and the output drive hub 62 of the motor.

Flywheel 56 according to the invention, includes a circular drive hub 64 which is coupled to the flywheel along the lower surface thereof by a pair of fasteners, such as screws 66. The drive hub 64 includes two recesses 68, 70 formed in the lower wall 71 thereof at 180° apart. The function of the recesses will be described fully hereinafter. It should be noted that a one piece flywheel may be provided if desired. In the latter case, the recesses would be included in the lower wall thereof. Other suitable flywheel embodiments also may be used if desired.

In addition to the aforementioned components, there is included in the tape head indexing assembly a lever arm arrangement 74 for actuating the rotatable cam wheel 44. The arrangement includes a support bracket 76 which is mounted on base wall 27 of the deck portion 29 by suitable fasteners, such as screws 33. A pair of support legs 78, 80 extend upwardly from the support bracket on either side of the tape head mounting fixture. The legs include aligned slots 82, 84 extending therethrough, slot 82 being deeper than slot 84. A tape guide member 86 is attached to one leg 78 of the support member for guiding the recording tape properly past the tape head during operation of the player.

Passing through the slots 82, 84 is a lever arm 88. The lever arm fits loosely in the slots to permit both pivotal and longitudinal movement thereof on the support legs. One end 90 of the lever arm is positioned normally adjacent an electromagnet 92 also fastened by means of a support bracket 94 and screw 96 to base wall 27 of the deck portion. An end of tape sensor switch 98 used to sense a foil strip (not shown) indicating the end of the tape tracks on a recording tape is also mounted on the support bracket 94. At the other end of the lever arm 88 there is provided a projection 100 which is turned upwardly for receipt in recesses 68, 70 formed in the lower wall 71 of the drive hub of flywheel 56.

A pawl assembly 102 is riveted onto the lever arm. The pawl 104 of the assembly is positioned adjacent a ratchet wheel 106 formed integrally with cam 44, for driving the ratchet wheel and cam rotatably. A return spring 108 is attached to the support leg 78 at aperture 110 and to the lever arm at aperture 112 to return the lever arm longitudinally to a normal position once the indexing of the tape head is completed.

Operation of the tape head indexing assembly according to the invention is effected either upon sensing the foil at the end of the tape tracks by sensor 98 or by manually depressing indexing switch button 22 to operate switch 25. When either of the latter events occur, electrical energy is supplied to the electromagnet 92. Energization of the electromagnet provides a magnetic field which attracts end 90 of the lever arm 88 to end 93 of the electromagnet (see FIG. 3). Attraction of the latter arm causes it to pivot in slots 82, 84 of support leg 78, 80. Because slot 82 in support leg 78 is deeper than slot 84 in leg 80, the lever arm pivots about leg 80. Pivotal movement of the lever arm moves projection 100 thereof into position for receipt in one of the recesses 68, 70 in the lower wall 71 of the drive hub of flywheel 56.

As the flywheel is rotated, one of the recesses revolves about and receives projection 100. When the latter occurs (see FIG. 4) the projection is engaged by the flywheel. The force of the rotating flywheel drives the lever arm longitudinally in the direction of arrow 115 (see FIG. 4) so that pawl 104 engages the ratchet wheel 106, rotating cam 44 to position a successive cam surface 50 into engagement with cam follower 42. The engagement of cam follower 42 by surface 50, causes the tape head 24 to be raised or lowered, as the case may be, to position pickups 28 of the tape head with respect to different recording tracks on a tape in a cartridge 12 received in cavity 14.

Figure 2:
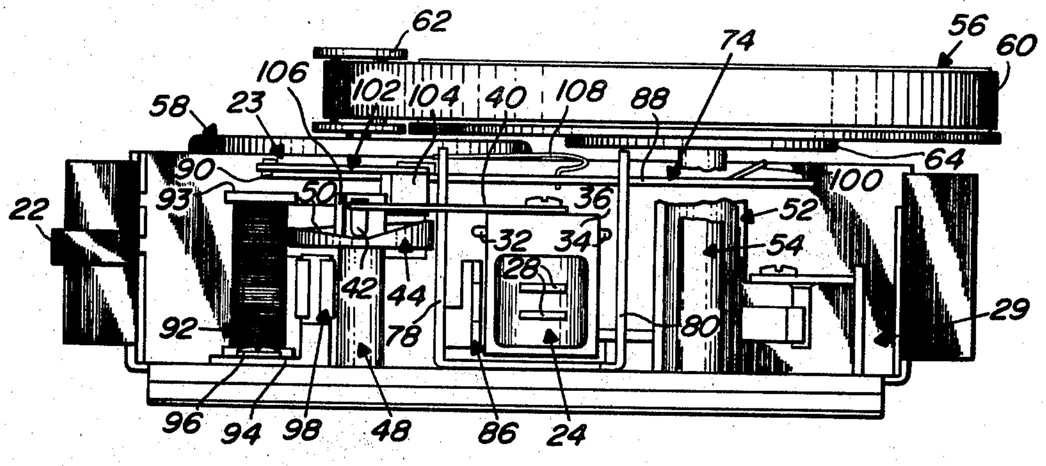
FIGS. 2, and 3 and 4 are front, partially sectioned views of the tape player of FIG. 1 illustrating the tape head indexing assembly and its operation according to the invention.
Figure 3:
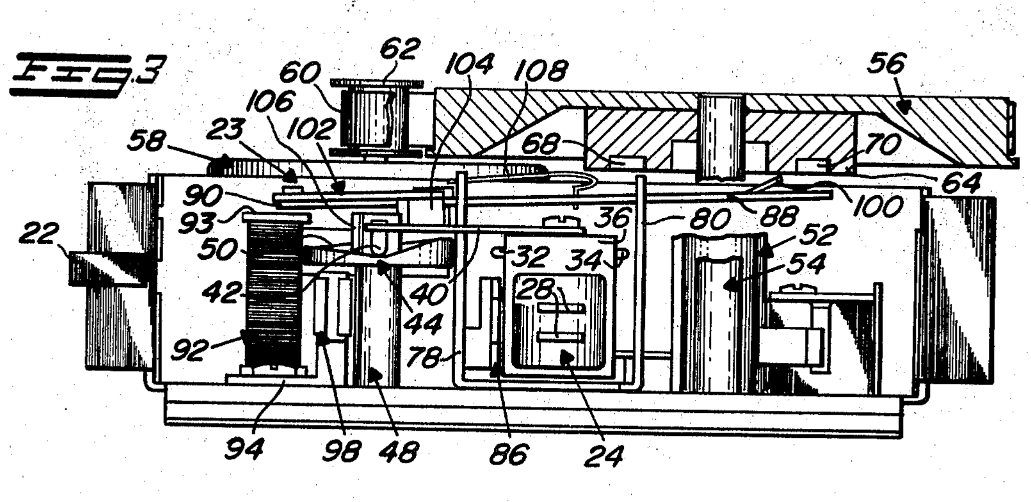
Figure 4:
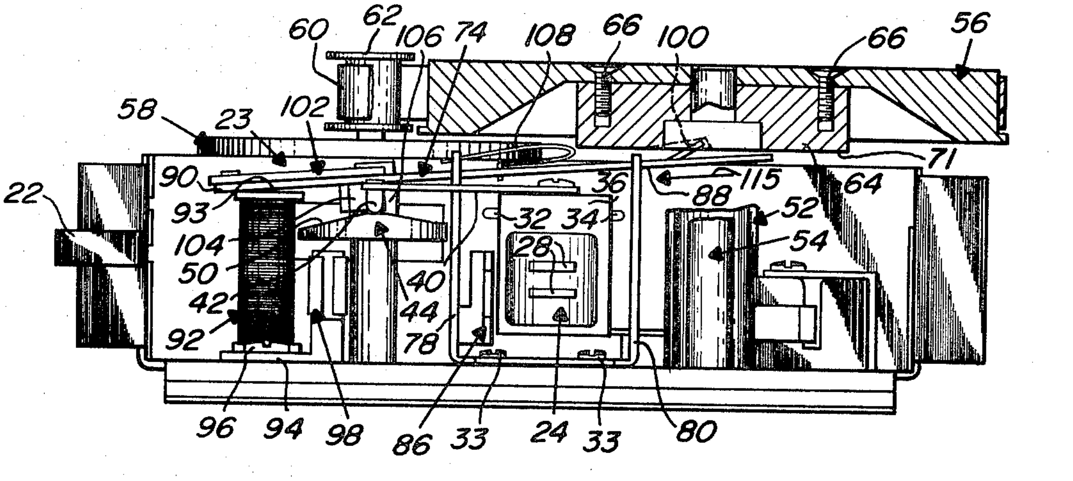

Almost immediately after the tape head has been indexed one track position, the electromagnet is deenergized, either by the passage of the end of the tape track past sensor 98 or due to the breaking of the circuit to the electromagnet by the release of actuator button 22. Deenergization of the electromagnet permits the lever arm to be driven back to a normal position by spring 108 coupled thereto. The lever arm likewise is pivoted back to its original position as shown in FIG. 2. If it is desired to index the tape head more than one track position, pushbutton 22 may be held in an operated position to maintain the electromagnet 92 in an energized state. In such a condition, the lever arm will be driven successively in a forth and back manner by the engagement of projection 100 in one of the recesses 78, 80 of the flywheel and by spring 108, respectively, to index the tape head to successive tape track positions. Once the desired tape track position is achieved, pushbutton 22 is released to discontinue the operation of the tape head indexing assembly.

Alternatively, the tape head indexing can be concluded after a single track position change even if button 22 is held in a depressed position. To accomplish the latter, a lighter spring 108 is employed. The decreased spring tension is easily overcome by the holding force of the electromagnet and as such the latter maintains the lever arm in an operated position indicated by arrow 115, so that the projection 100 is out of alignment with the recesses 78, 80. Thus, only the release of the pushbutton 22 to eliminate the magnetic holding field permits the return spring to drive the lever arm back to its original position for additional operation upon a successive depression of pushbutton 22.

A heavier spring 108, is employed in the case wherein it is desired to have continuous stepping of the tape head so long as the pushbutton is depressed. The heavier spring returns the lever arm to a position whereat the projection can be engaged over and over again by the rotating flywheel despite the holding force of the electromagnet. It should be noted, however, that the electromagnet does maintain the lever arm pivoted so that the projection 100 will be received in recesses 78, 80 for continuous operation.

Figure 5:
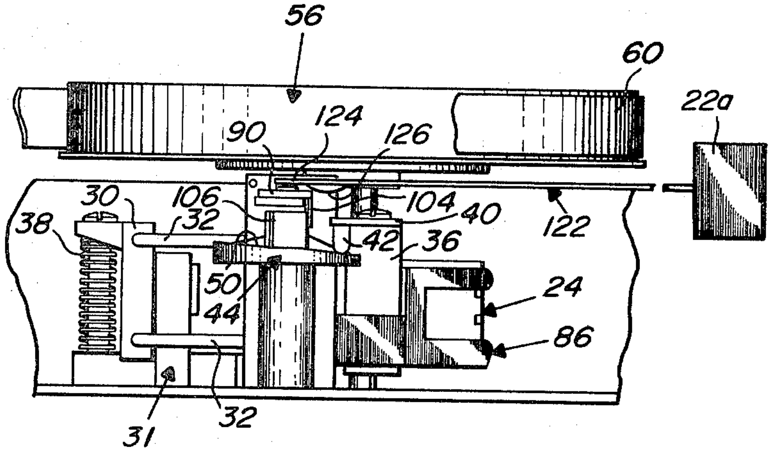
FIG. 5 is a side, sectional view of an alternative embodiment of the tape head indexing assembly according to the invention.
Figure 6:
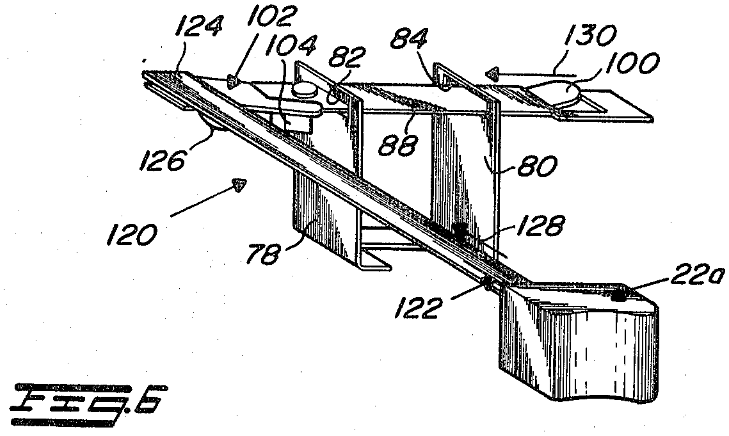
FIG. 6 is a perspective view of a manual actuating mechanism for the tape head indexing assembly according to the invention.
Figure 7:
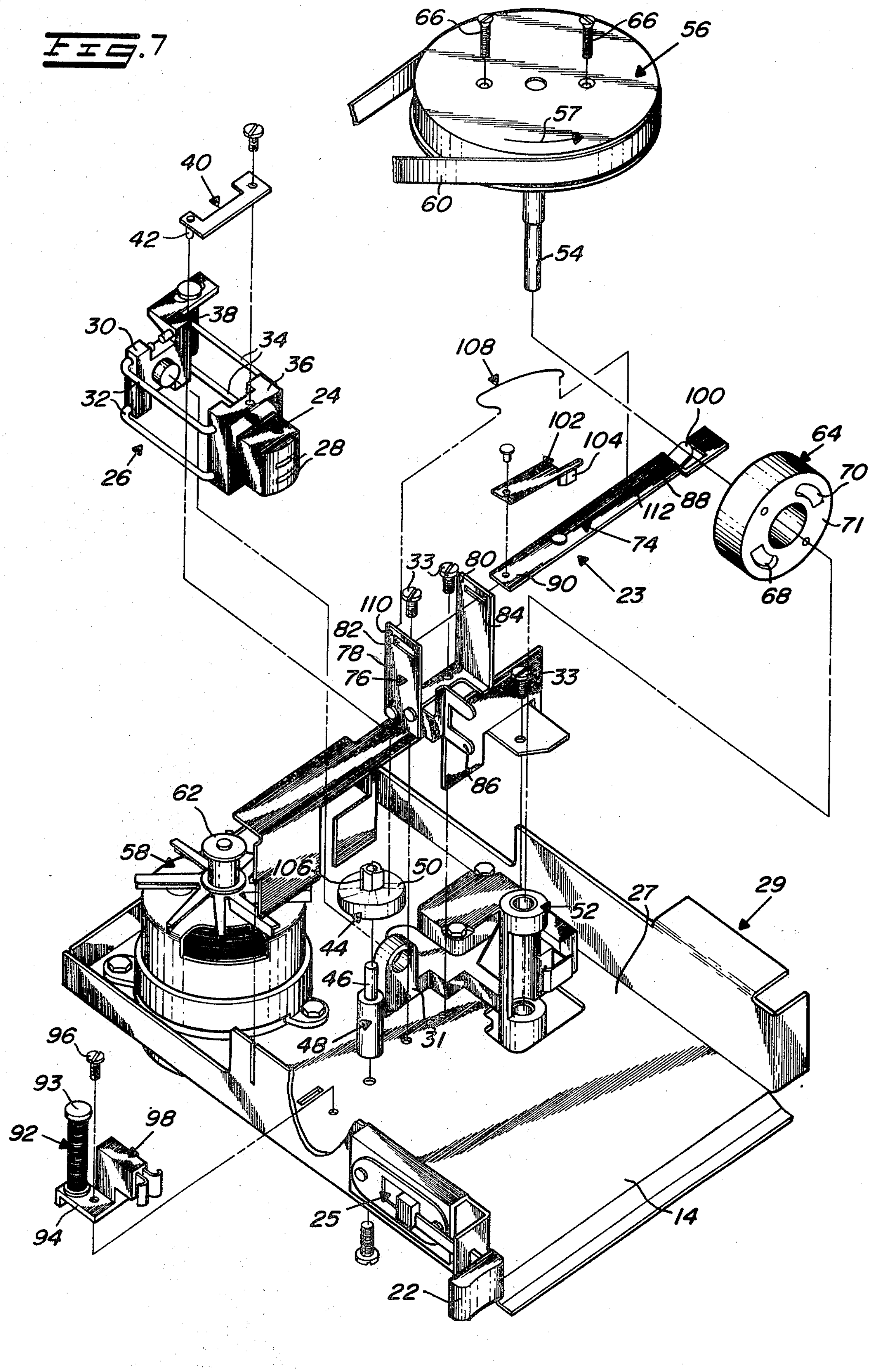
FIG. 7 is an exploded, perspective view of the tape head indexing assembly according to the invention.

Referring now to FIGS. 5 and 6 of the drawings, there is illustrated therein an alternative embodiment of a tape head indexing assembly according to the invention. The assembly includes the same components as the assembly shown in the other figures of the drawings, except that the indexing actuation is not accomplished by means of an electrically operated electromagnet. Instead, a mechanical linkage 120 is used. The mechanical linkage 120 includes a pushbutton 22*a* which has attached thereto an arm 122. At the end 124 there is provided a cam surface 126 which is positioned adjacent the end 90 of the lever arm.

Depression of pushbutton 22*a*, moves arm 122 in the direction of arrow 128 (see FIG. 6) causing the cam surface 126 to pivot lever arm 88. At this time, projection 100 is raised for engagement by flywheel 56 in one of the recesses 78, 80. In a like manner, the flywheel 56 drives arm 88 in the direction of arrow 130 (FIG. 6) in sliding engagement with the cam surface 126 of the arm 122 so that pawl 104 engages ratchet wheel 106 to rotate a new cam surface 40 of cam 44 into engagement with cam follower 42, for indexing the tape head.

A return spring likewise is employed to return the lever arm 88 to its original position subsequent to indexing the tape head one track position. In addition, a spring (not shown) returns the arm 122 and pushbutton 22*a* to its original position upon release thereof. As in the case of the electrically operated actuator, the mechanical linkage can be adjusted to permit either continuous operation of the tape head indexing mechanism or a single operation thereof even though the pushbutton 22*a* is held in a depressed position. To accomplish the latter, the relationship between the cam surface 126 of arm 122 and end 90 of the lever arm must be adjusted. For a single operation of the tape head indexing mechanism, the friction between the cam surface 126 and lever arm 90 must be increased and for continuous driving of the tape head, the friction must be reduced.

As can be seen from the above description, the tape head indexing assembly according to the invention is relatively simple in construction yet effective in operation. The assembly eliminates the use of a large solenoid as is the case of conventional tape head indexing assemblies and substitutes therefor either a simple electromagnet or mechanical means for initiating the operation of the device. Because the driving force necessary to move the lever arm 88 to index the tape head is relatively small, the energy required from the flywheel 56 is minimal. As such, no adverse effect on the driving or playing back of information on the tape in cartridge inserted into the player is noticeable.

While two alternative embodiments of the invention have been shown and described, it should be understood that the invention is not limited thereto since many modifications may be made. It is therefore contemplated to cover by the present application any and all such modifications as fall within the true spirit and scope of the appended claims.

I claim:

1. A magnetic tape head indexing assembly for use in a cartridge tape player including a magnetic tape head mounted for movement with respect to the various recording tracks on a magnetic tape in a cartridge received in the player, a rotatably mounted capstan for driving the tape through said cartridge and a flywheel mounted on said capstan for rotation therewith, said flywheel imparting rotatable movement to said capstan, said tape head indexing assembly including in combination: a rotatable cam including a plurality of cam surfaces, each of which corresponds to one of the recording tracks on said tape, said cam being coactable with said tape head for moving the latter to different positions with respect to said tape tracks in accordance with the rotation of said cam, a lever arm mounted adjacent said tape head for pivotal and longitudinal movement, one end of said lever arm being positioned adjacent said rotatable cam for engagement therewith, the opposite end of said lever arm being positioned adjacent said flywheel for engagement therewith, and actuator means opperable to pivot said lever arm from a first, normal position to a second, actuated position whereby said opposite end thereof engages said rotating flywheel, the force provided by said flywheel driving said lever arm longitudinally from a first position to a second position so that said one end engages said cam to rotate the latter for repositioning said tape head.

2. A magnetic tape head indexing assembly as claimed in claim 1 wherein said actuator means include electromagnet means mounted adjacent said one end of said lever arm, said electromagnet means being energizable for attracting said one end of said lever arm to pivot the latter, whereby said opposite end engages said rotating flywheel.

3. A magnetic tape head indexing assembly as claimed in claim 1 wherein said actuator means include a manually operable actuator arm movable from a first to a second position for engaging said one end of said lever arm to pivot the latter, whereby said opposite end engages said rotating flywheel.

4. A magnetic tape head indexing assembly as claimed in claim 1 wherein said cam further includes a ratchet wheel mounted thereon for rotation therewith and wherein said lever arm includes a pawl extending therefrom, said pawl being positioned for engagement with said ratchet wheel upon pivoting said lever arm to said second position, whereby longitudinal movement of said lever arm moves said pawl into engagement with said ratchet wheel for rotating said cam.

5. A magnetic tape head indexing assembly as claimed in claim 4 wherein said flywheel includes at least one recess provided in one surface thereof and wherein said lever arm includes at said opposite end, a projection positioned for receipt in said recess upon pivoting said lever arm to said second position, whereby said lever arm is driven longitudinally to index said tape head.

6. A magnetic tape head indexing assembly as claimed in claim 5 further including spring means coupled to said lever arm for driving the latter longitudinally to said first position for returning the lever arm to its original position subsequent to the indexing of said tape head between recording tracks.

7. A magnetic tape head indexing assembly as claimed in claim 6 wherein the force provided by said spring is sufficient to return said lever arm to said first position despite the maintenance of said actuator means in said operable condition, whereby said tape head is indexed to successive tape track positions so long as said actuator means is operated.

8. In a cartridge tape player adapted to receive a multi-track tape cartridge and play back information recorded on a recording tape in said cartridge, including a magnetic tape head mounted for movement with respect to the various tracks on said tape, a rotatable capstan for driving said tape through said cartridge and a flywheel mounted on said capstan for imparting rotation thereto, a tape head indexing assembly including in combination: a rotatably mounted cam having a plurality of cam surfaces, each of which corresponds to one of said recording tracks on said tape, cam follower means coupled to said tape head and being coactable with said rotatable cam for moving the tape head to different positions corresponding to said various tracks on said tape in accordance with the rotation of said cam and indexing actuator means including an arm member mounted for pivotal and longitudinal movement, a first end of said arm member being positioned adjacent said cam and including means for engaging said cam for driving the latter rotationally, the opposite, second end of said arm member being positioned adjacent said flywheel and including means for engagement therewith, and means for pivoting said arm member to move said flywheel engaging means into engagement with said flywheel for driving said arm longitudinally, whereby said cam engaging means engages said cam for rotating the latter to index said tape head with respect to said tape tracks.

9. A cartridge tape player as claimed in claim 8 further including ratchet wheel means coupled to said cam, wherein said arm member includes pawl means formed at said first end thereof for engagement with said ratchet wheel means, wherein said flywheel includes a lower wall portion defining a pair of recesses therein provided at substantially 180° thereabout and wherein said arm member further includes a projection extending from said opposite, second end for receipt in one of said recesses upon moving said arm member pivotally, whereby said flywheel drives said arm member longitudinally to cause said pawl means to engage said ratchet wheel means for rotating said cam.

10. A cartridge tape player as claimed in claim 8 wherein said means for pivoting said arm member include electromagnet means mounted adjacent said one end of said arm member, said electromagnet means being energizable for attracting said one end of said arm member to pivot the latter, whereby said opposite end engages said rotating flywheel.

11. A cartridge tape player as claimed in claim 8 wherein said means for pivoting said arm member include a manually operable actuator arm movable from a first to a second position for engaging said first end of said arm member to pivot the latter, whereby said opposite, second end of said arm member engages said rotating flywheel.

* * * * *

UNITED STATES PATENT OFFICE
CERTIFICATE OF CORRECTION

PATENT NO. 3,869,724

DATED March 4, 1975

INVENTOR(S) Edwin S. Bara

It is certified that error appears in the above-identified patent and that said Letters Patent are hereby corrected as shown below:

Column 2, line 13 change "th" to --the--.

Column 5, line 37 change "40" to --50--.

Column 5, line 66 after "in" insert --a--.

Column 6, line 29 change "opperable" to --operable--.

Signed and sealed this 27th day of May 1975.

(SEAL)
Attest:

RUTH C. MASON
Attesting Officer

C. MARSHALL DANN
Commissioner of Patents
and Trademarks